United States Patent
Holzberg et al.

(10) Patent No.: US 7,837,567 B2
(45) Date of Patent: Nov. 23, 2010

(54) METHOD AND SYSTEM FOR CUSTOMIZING A THEME PARK EXPERIENCE

(75) Inventors: Roger Holzberg, Burbank, CA (US); Edward Kummer, Santa Monica, CA (US); Jeffrey Voris, Los Angeles, CA (US); Seth Mendelsohn, Simi Valley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 474 days.

(21) Appl. No.: 11/999,532

(22) Filed: Dec. 5, 2007

(65) Prior Publication Data

US 2009/0149265 A1 Jun. 11, 2009

(51) Int. Cl.
 *A63G 31/16* (2006.01)
 *A63G 31/00* (2006.01)
(52) U.S. Cl. .................. 472/59; 472/60; 463/42
(58) Field of Classification Search ........... 472/59–61, 472/88–90, 117, 128, 129; 463/7, 52, 53, 463/42
See application file for complete search history.

(56) References Cited

U.S. PATENT DOCUMENTS

| | | | | |
|---|---|---|---|---|
| 5,785,592 A | * | 7/1998 | Jacobsen | 463/7 |
| 6,079,982 A | * | 6/2000 | Meader | 434/29 |
| 6,488,590 B2 | * | 12/2002 | Katayama | 472/90 |
| 6,796,908 B2 | * | 9/2004 | Weston | 472/43 |
| 2006/0012813 A1 | | 1/2006 | Lapstun et al. | |
| 2006/0026521 A1 | | 2/2006 | Hotelling | |
| 2006/0026535 A1 | | 2/2006 | Hotelling | |
| 2006/0252563 A1 | * | 11/2006 | Werner | 472/117 |
| 2006/0293103 A1 | | 12/2006 | Mendelsohn | |
| 2006/0293110 A1 | | 12/2006 | Mendelsohn | |
| 2007/0013671 A1 | | 1/2007 | Zadesky | |

* cited by examiner

*Primary Examiner*—Kien T Nguyen
(74) *Attorney, Agent, or Firm*—Farjami & Farjami LLP

(57) ABSTRACT

There is provided a method of customizing a theme park experience comprising designating a theme park experience motif, selecting customizable features associated with the designated motif, and assembling the designated motif and the selected customizable features into a custom virtual theme park experience suitable for adaptation as a customized theme park experience. In one embodiment, the method includes hosting the custom virtual theme park experience, rating the popularity of the custom virtual theme park experience among a community of users, and adapting the custom virtual theme park experience to a customized theme park experience.

19 Claims, 4 Drawing Sheets

US 7,837,567 B2

METHOD AND SYSTEM FOR CUSTOMIZING A THEME PARK EXPERIENCE

BACKGROUND OF THE INVENTION

1. Field of the Invention

The present invention relates generally to computer mediated entertainment content. More particularly, the present invention relates to customizing entertainment content.

2. Background Art

To paraphrase Bill Murray's character in the movie "Mad Dog and Glory," theme parks are the expediters of our dreams. The success of theme parks, such as Disneyland in Anaheim, Calif., or Disney World, in Orlando, Fla., to attract visitors from around the world is testimony to the effectiveness with which those venues have captured a collective imagination and rendered it as simulated reality. The very success of these enterprises in identifying themes that are mutually attractive to a broad cross section of the population highlights one of the challenges faced by a theme park seeking to attract visitors, the challenge of offering in-park experiences exploring themes and having features that are generally appealing.

One way in which theme parks have responded to this challenge in the past is by diversifying the selection of attractions available to guests. By offering a variety of attractions of different types, and even among attractions of a similar type, presenting those experiences through a variety of themes, a broad spectrum of entertainment preferences may be catered to. For example, a single theme park may offer rollercoaster ride type attractions, water ride type attractions, entertainment-based attractions, midway game type attractions, as well as other distinctive types of experiences, in an effort to accommodate a variety of aesthetic sensibilities. Within a particular type of attraction, for example a rollercoaster type ride, the experience may be offered as a child's fantasy adventure, such as Mr. Toad's Wild Ride; presented with a traditional fairy tale backdrop, as in the Matterhorn bobsled ride; or be given a futuristic spin, like Space Mountain, all of which are offered as alternative rollercoaster type attractions at the Disneyland theme park.

That the previously described approach to meeting a spectrum of entertainment preferences has historically been successful is evidenced by the worldwide popularity of Disneyland and other theme parks as vacation destinations. However, the advent of programmable portable entertainment products and devices, and the almost limitless variety of entertainment options they offer, have raised public expectations regarding the level of personal selection and customizability available to an entertainment consumer. As theme park guests begin to apply some of these heightened expectations fed by the increasing ubiquity of personal entertainment devices, theme parks may be forced to offer an ever greater variety of experiences in order to continue to provide the high level of entertainment satisfaction they have traditionally been identified with.

One strategy for meeting this new challenge is to increase the number and continue to diversify the types of attractions available in-park. Due to cost and resource constraints, however, there is a practical limit to how many distinct physical attractions a theme park venue can support. As a result, and in the face of greater consumer demand for individual choice, it may no longer suffice for a theme park to offer a universal in-park experience to be commonly shared by all guests, no matter how artfully selected or designed that common experience may be. Consequently, in order to continue to provide the public with a high level of entertainment satisfaction, theme parks may be compelled to find a way to provide a variety of distinct experiences from a single in-park attraction.

Accordingly, there is a need to overcome the drawbacks and deficiencies in the art by providing a solution enabling a theme park guest to enjoy a customized experience when interacting with an in-park attraction.

SUMMARY OF THE INVENTION

A method and system for customizing a theme park experience, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
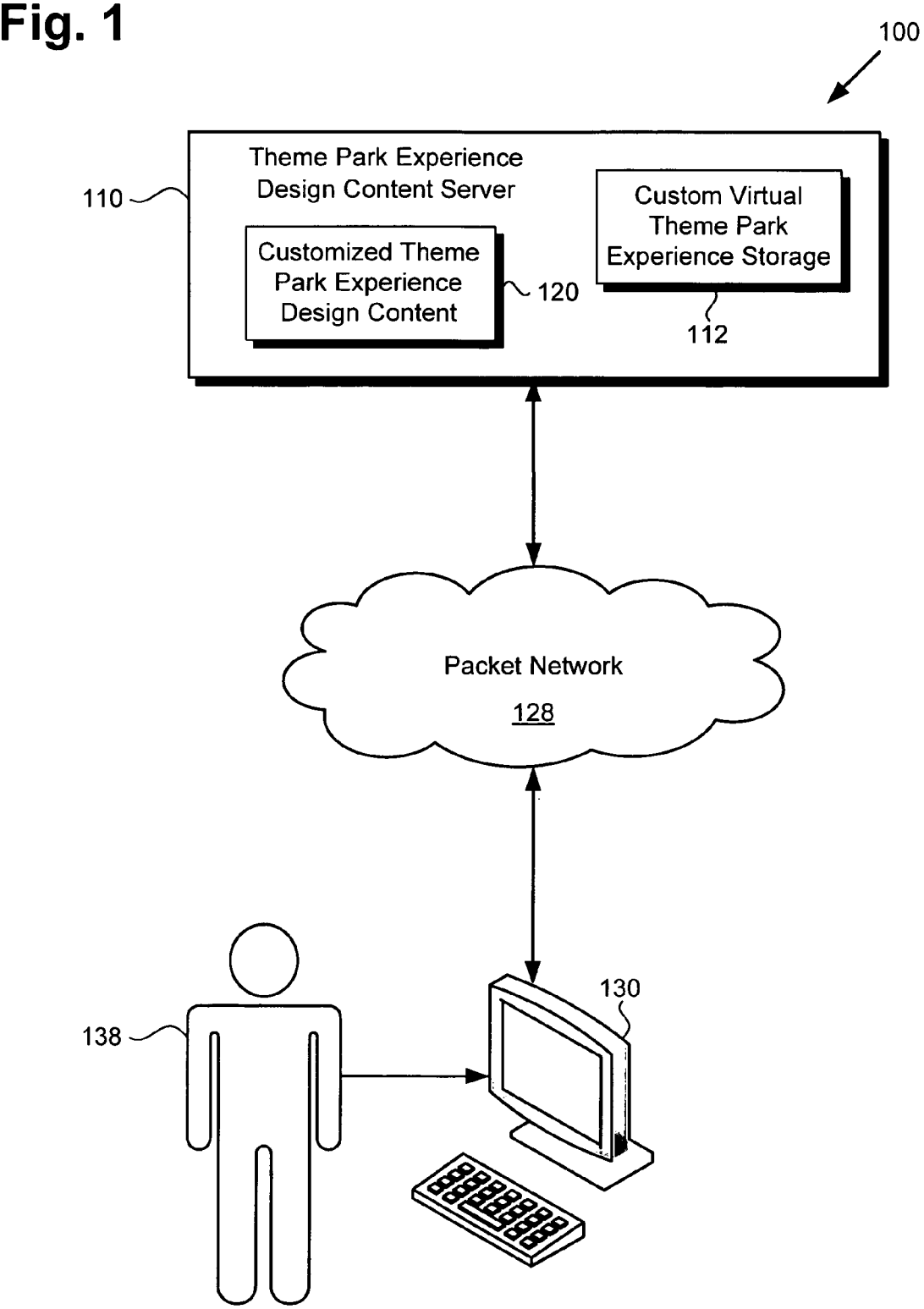
FIG. 1 shows a diagram of an exemplary system for customizing a theme park experience, according to one embodiment of the present invention.

The present application is directed to a method and system for customizing a theme park experience. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows a diagram of an exemplary system for customizing a theme park experience, according to one embodiment of the present invention. In the embodiment of FIG. 1, system 100 comprises theme park experience design content server 110 including custom virtual theme park experience storage 112 and customized theme park experience design content 120, packet network 128, and client computer 130. Also shown in FIG. 1 is user 138.

According to the embodiment of FIG. 1, user 138 may utilize client computer 130 and packet network 128 to access customized theme park experience design content 120 on theme park experience design content server 110. User 138 may then use customized theme park experience design content 120 to produce a custom virtual theme park experience suitable for adaptation as a customized theme park experience. The particular custom virtual theme park experience produced by user 138 may then be stored in custom virtual theme park experience storage 112 for enjoyment by user 138 or other users. User 138 may subsequently enjoy the adapted customized theme park experience as an in-park experience in a number of different ways, according to different embodiments of the present invention.

In one embodiment, the custom virtual theme park experience produced using customized theme park design content 120 may be hosted for the enjoyment and evaluation of a community of users, i.e., other users such as user 138. In that embodiment, for example, the custom virtual theme park experience may be stored in custom virtual theme park experience storage 112 and hosted to an online community on theme park experience design content server 110, accessible through packet network 128. There, members of the online community may enjoy the custom virtual theme park experience produced by user 138, and indicate their level of enjoyment by providing a rating feedback. Similarly, user 138 may access custom virtual theme park experiences produced by other users and stored in custom virtual theme park experience storage 112, and provide a rating feedback. Subsequently, one or more of the custom virtual theme park experiences could be adapted as a customized theme park experience, for enjoyment by user 138 and others as visitors to a theme park. Selection of a custom virtual theme park experience for adaptation as a customized theme park experience may be made based on the popularity of the virtual theme park experience among members of the community of users, for example, or based on other criteria.

In another embodiment, system 100 might be utilized to produce a customized theme park experience personal to user 138. In that embodiment, user 138 might personalize a guided tour of a theme park by selecting a tour guide and a focus of the tour, such as exciting rollercoaster rides, for example. For instance, a prospective visitor to Disneyland, in Anaheim, Calif., might customize a virtual tour of the most exciting new rollercoaster rides guided by Walt Disney himself. Unlike the previously described embodiment, the present example involves a personal custom virtual theme park experience. That custom virtual theme park experience could then be stored in custom virtual theme park experience storage 112, and adapted as a customized theme park experience available to user 138 as an in-park experience on a subsequent visit, perhaps to be enjoyed in conjunction with a headset or head mounted video display. According to the present embodiment, the customized theme park experience may be associated with a user access code, making it possible for user 138 to retrieve his or her personalized experience at the theme park, for enjoyment in-park.

It is noted that although client computer 130 is represented as a personal computer (PC) in FIG. 1, in one embodiment client computer 130 may comprise a mobile communication device such as a tablet computer, mobile telephone, or personal digital assistant (PDA), for example. Moreover, in one embodiment, client computer 130 may comprise a mobile communication device including a digital video player configured to provide a multi-media display as part of a customized theme park experience.

As shown in FIG. 1, customized theme park experience design content 120 may be accessed through packet network 128. In that instance, customized theme park experience design content 120 may comprise a web application, accessible over a packet network such as the Internet, for example. Alternatively, customized theme park experience design content 120 may reside on a server supporting a local area network (LAN), in the theme park context, for instance, or included in another type of limited distribution network. In another embodiment, customized theme park experience design content 120 may be stored on a portable computer readable storage medium such as a compact disc read-only memory (CD-ROM). In an analogous manner, in another embodiment, custom virtual theme park experience storage 112 may reside on a server supporting a LAN or other limited distribution network.

Figure 2:
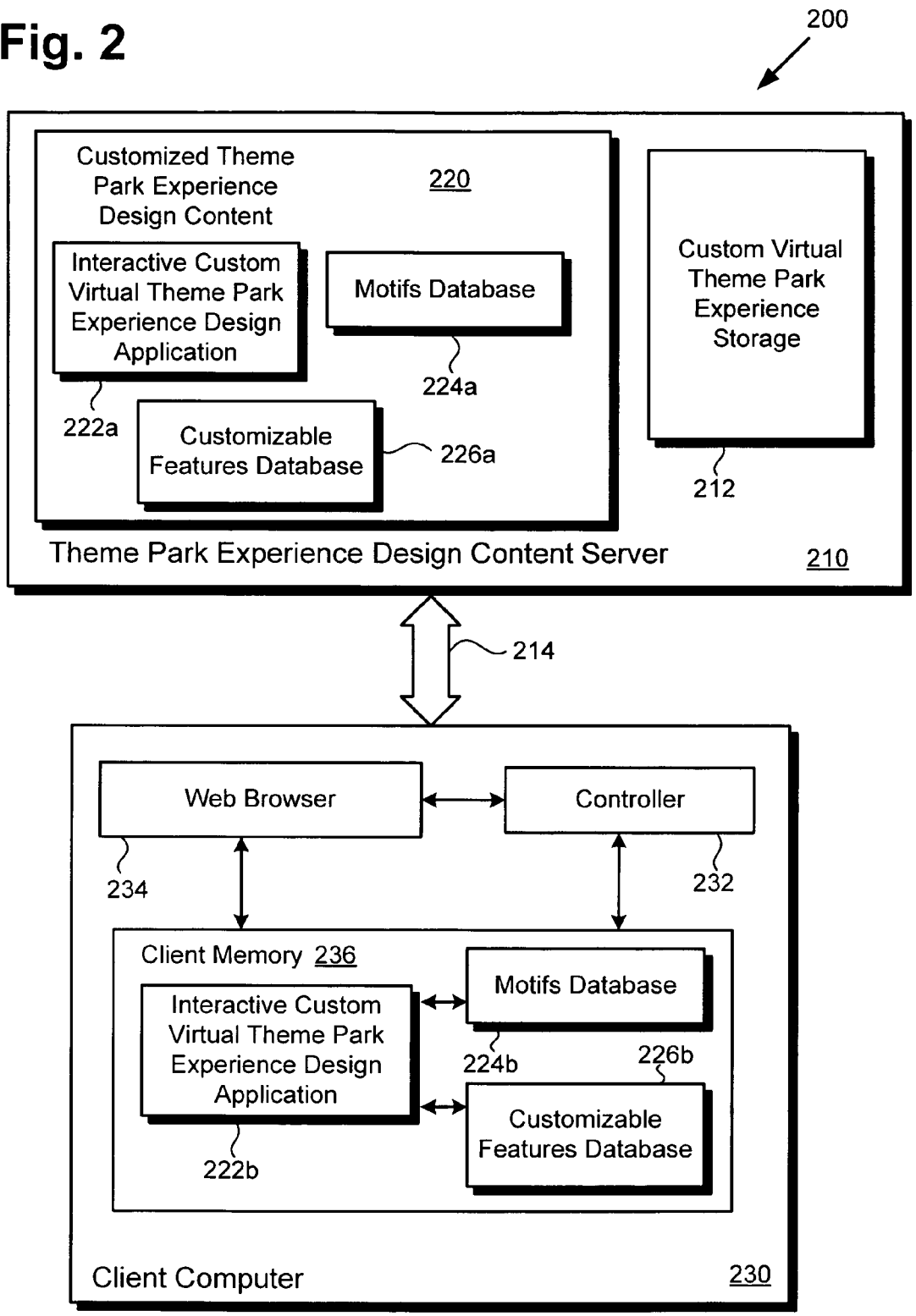
FIG. 2 shows a more detailed exemplary embodiment of a system for customizing a theme park experience, according to one embodiment of the present invention.

Turning now to FIG. 2, FIG. 2 provides a more detailed embodiment showing exemplary interactive theme park experience customizing system 200. Interactive theme park experience customizing system 200 in FIG. 2 includes client computer 230 receiving a download via communication link 214 from theme park experience design content server 210 including custom virtual theme park experience storage 212 and customized theme park experience design content 220. Client computer 230 corresponds to client computer 130, in FIG. 1. As shown in FIG. 2, client computer 230 comprises controller 232, web browser 234, and client memory 236.

Theme park experience design content server 210, custom virtual theme park experience storage 212, and customized theme park experience design content 220 correspond respectively to theme park experience design content server 110, custom virtual theme park experience storage 112, and customized theme park experience design content 120, in FIG. 1. As shown in FIG. 2, customized theme park experience design content 220 comprises interactive custom virtual theme park experience design application 222a, motifs database 224a, and customizable features database 226a. Also shown in FIG. 2 are interactive custom virtual theme park experience design application 222b, motifs database 224b, and customizable features database 226b.

In the present embodiment, interactive custom virtual theme park experience design application 222b, motifs database 224b, and customizable features database 226b are located in client memory 236, having been received from theme park experience design content server 210 via communication link 214. In the present embodiment, communication link 214 represents download of interactive custom virtual theme park experience design application 222a, motifs database 224a, and customizable features database 226a over a packet network, for example. In another embodiment, communication link 214 may represent transfer of interactive custom virtual theme park experience design application 222a, motifs database 224a, and customizable features database 226a from a CD-ROM or other portable computer readable storage medium. Once transferred, the various customized theme park experience design content components, including interactive custom virtual theme park experience design application 222b, motifs database 224b, and customizable features database 226b may be stored in client memory 236 and run locally on client computer 230. It is noted that communication link 214 is shown as a two-way communication, to correspond to transfer of a custom virtual theme park experience produced on client computer 230 to custom virtual theme park experience storage 212 residing on theme park experience content server 210.

Controller 232 may be the central processing unit for client computer 230, for example, in which role controller 232 runs the client computer operating system, launches web browser 234, and facilitates execution of interactive custom virtual theme park experience design application 222b. Web browser 234, under the control of controller 232, may execute interactive custom virtual theme park experience design application 222b to enable a user of client computer 230 to customize a theme park experience by selecting assets from customizable features database 226b, and assembling the selected customizable features with a theme park experience motif designated from among predetermined motifs contained in motifs database 224b.

Implementation of the embodiment of FIG. 2 permits a user of client computer 230 to run interactive custom virtual theme park experience design application 222b and thereby designate a motif from motifs database 224b, select customizable features from customizable features database 226b, and assemble the designated motif and selected customizable features into a custom virtual theme park experience suitable for adaptation as a customized theme park experience. Using the specific example of a jungle warfare shooting game to illustrate the present embodiment, interactive theme park experience customizing system 200, in FIG. 2, permits a user of client computer 230 to produce a custom virtual jungle warfare shooting game suitable for adaptation to a theme park ride, or virtual reality attraction.

By downloading customized theme park experience design content 220 and running interactive custom virtual theme park experience design application 222b, a user of client computer 230 can designate a shooting game contained as a predetermined motif in motifs database 224b, as the a template from which to design a custom virtual theme park experience. Having designated a shooting game as the designated motif, the user of client computer 230 may select customizable features, such as a jungle warfare backdrop, targets, target values, etcetera, from customizable features database 226b. Interactive custom virtual theme park experience design application 222b can then mediate assembly of the designated motif and selected customizable features to produce a jungle warfare shooting game customized by the user of client computer 230.

The custom jungle warfare shooting game produced by the user of client computer 230, in FIG. 2, can then be transferred to custom virtual theme park experience storage 212 and be stored there. That custom virtual theme park experience may in some embodiments be accessed and experienced, as a computer game for example, by other members of a community of users. Subsequently, the custom jungle warfare shooting game produced by the user of client computer 230 may be adapted as a customized theme park experience. For instance, the custom virtual jungle warfare shooting game produced by the user of client computer 230 may be incorporated into a water ride at Disneyland, at which riders could use simulated guns mounted on a river craft to destroy targets displayed on video monitors positioned at various points along the course of the ride. A decision to adapt the custom virtual jungle warfare shooting game could be based on its rated popularity among a community of users accessing theme park experience design content server 210, ease of implementation as an in-park attraction, or other criteria.

Figure 3:
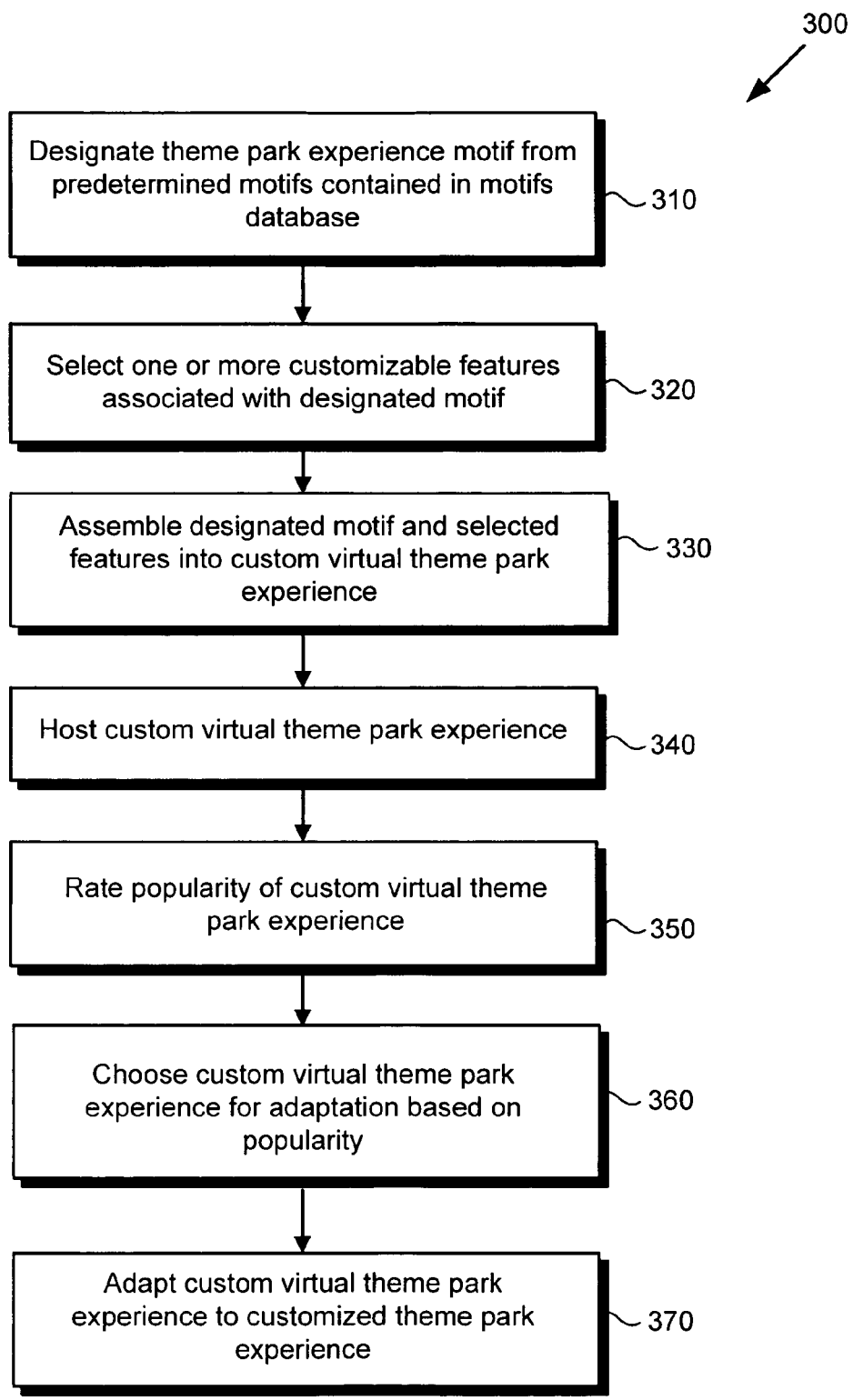
FIG. 3 is a flowchart presenting a method of customizing a theme park experience, according to one embodiment of the present invention.

FIGS. 1 and 2 are now further described in conjunction with FIG. 3, which presents an exemplary method of producing a custom virtual theme park experience for adaptation as a customized theme park experience. Certain details and features have been left out of flowchart 300 that are apparent to a person of ordinary skill in the art. For example, a step may consist of one or more substeps or may involve specialized equipment or materials, as known in the art. While steps 310 through 370 indicated in flowchart 300 are sufficient to describe one embodiment of the present method, other embodiments may utilize steps different from those shown in flowchart 300, or may include more, or fewer steps.

Starting with step 310 in FIG. 3 and system 200 in FIG. 2, step 310 of flowchart 300 comprises designating a theme park experience motif from among predetermined motifs contained in a motifs database. As described in conjunction with FIG. 2, designating a theme park experience motif may occur after download of customized theme park experience design content 220, as a result of running interactive custom virtual theme park experience design application 222b on client computer 230. Although in one embodiment, customized theme park experience content 220 is downloaded or otherwise transferred to client computer 230, in another embodiment customized theme park experience content 220 may be provided, either on theme park experience design content server 210, or through some other source. In that embodiment, the provided content may be accessed using client computer 230 and run remotely, rather than being transferred to and run on client computer 230. Whether performed locally or remotely, however, designation of a theme park experience motif occurs in response to an input received by client computer 230.

Designation of a theme park experience motif in step 310 establishes a theme and template for subsequent customization steps. For example, the menu of customizable features available in a subsequent step may be determined by the particular motif designated in step 310. The designated motif is chosen from among predetermined motifs contained in a motifs database accessible through the interactive custom virtual theme park design application utilized by client computer 230. Examples of theme park experience motifs might include shooting games, dramatic entertainments, or instructional presentations such as guided tours.

The exemplary method of flowchart 300 continues with step 320, which comprises selecting one or more customizable features associated with the designated motif from among features contained in a customizable features database. Returning to the example of a jungle warfare shooting game described in relation to FIG. 2, step 320 corresponds to selection of a jungle warfare environment, specific landscape features, targets, target values, and other specific customizable features associated with a shooting game motif. As an alternative example, where step 310 is performed through designation of an informative presentation, the customizable features associated with that motif might include the type of presentation, such as a guided tour, a particular venue, a tour guide identity, and other features relevant to customizing an informative presentation.

Flowchart 300 continues with step 330, comprising assembling the designated motif and the selected features into a custom virtual theme park experience suitable for adaptation as a customized theme park experience. Suitability of the custom virtual theme park experience for adaptation as a customized theme park experience for enjoyment in-park is assured by provision, as part of customized theme park experience design content 220, of predetermined theme park experience motifs and associated customizable features. In step 330, the features selected in step 320 are harmonized and integrated with the motif designated in step 310 to produce a custom virtual product. Continuing with the example of the jungle warfare shooting game, step 330 corresponds to completion of a computer game version of a jungle warfare shooting game playable by a user of computer 230, for example.

Following step 340 of flowchart 300 comprises hosting the custom virtual theme park experience for enjoyment by a community of users. After the designated motif and selected customizable features have been assembled in step 330 to produce a custom virtual theme park experience, the custom virtual theme park experience may be stored in custom virtual theme park experience storage 212 on theme park experience design content server 210. According to the present embodiment, that custom virtual theme park experience is made accessible to a community of users who may enjoy it, by playing a computer version of the jungle warfare shooting game, for example. After enjoying the custom virtual theme park experience produced by the user of client computer 230, the community of users may register their level of enjoyment of the experience by providing rating data in step 350. Rating may occur on a scale of one to five stars, for example, with five stars being the highest rating. Individual user ratings may be collated to determine an overall rating corresponding to the popularity of the custom virtual theme park experience among the community of users.

Continuing with step 360 of flowchart 300, step 360 comprises choosing a custom virtual theme park experience for adaptation to a customized theme park experience for enjoyment in-park. As in the exemplary method corresponding to flowchart 300, a custom virtual theme park experience can be chosen for adaptation based on its popularity among the community of users. That popularity may be shown by the rating performed in step 350. Using the exemplary rating system described previously, perhaps only the best of the best custom virtual theme park experiences, as indicated by five star ratings, are to be chosen for adaptation as in-park attractions. In another embodiment, however, other criteria, such as convenience of implementation, or potential synergy with other theme park related products or promotions may provide the criteria by which custom virtual theme park experiences are chosen for adaptation as in-park customized theme park experiences.

In step 370, the custom virtual theme park experience chosen in step 360 is adapted as a customized theme park experience. Adaptation may comprise digital translation of a computer game for integration with a theme park ride, as in the case of the jungle warfare shooting game/theme park water ride embodiment described previously. In another embodiment, adaptation may include creating digital or animatronic characters to correspond to characters in a custom virtual dramatic entertainment produced by a user of client computer 230. In yet another embodiment, adaptation may comprise providing a tour including a video simulation of a personalized tour guide by means of a head mounted display unit, for example.

Figure 4:
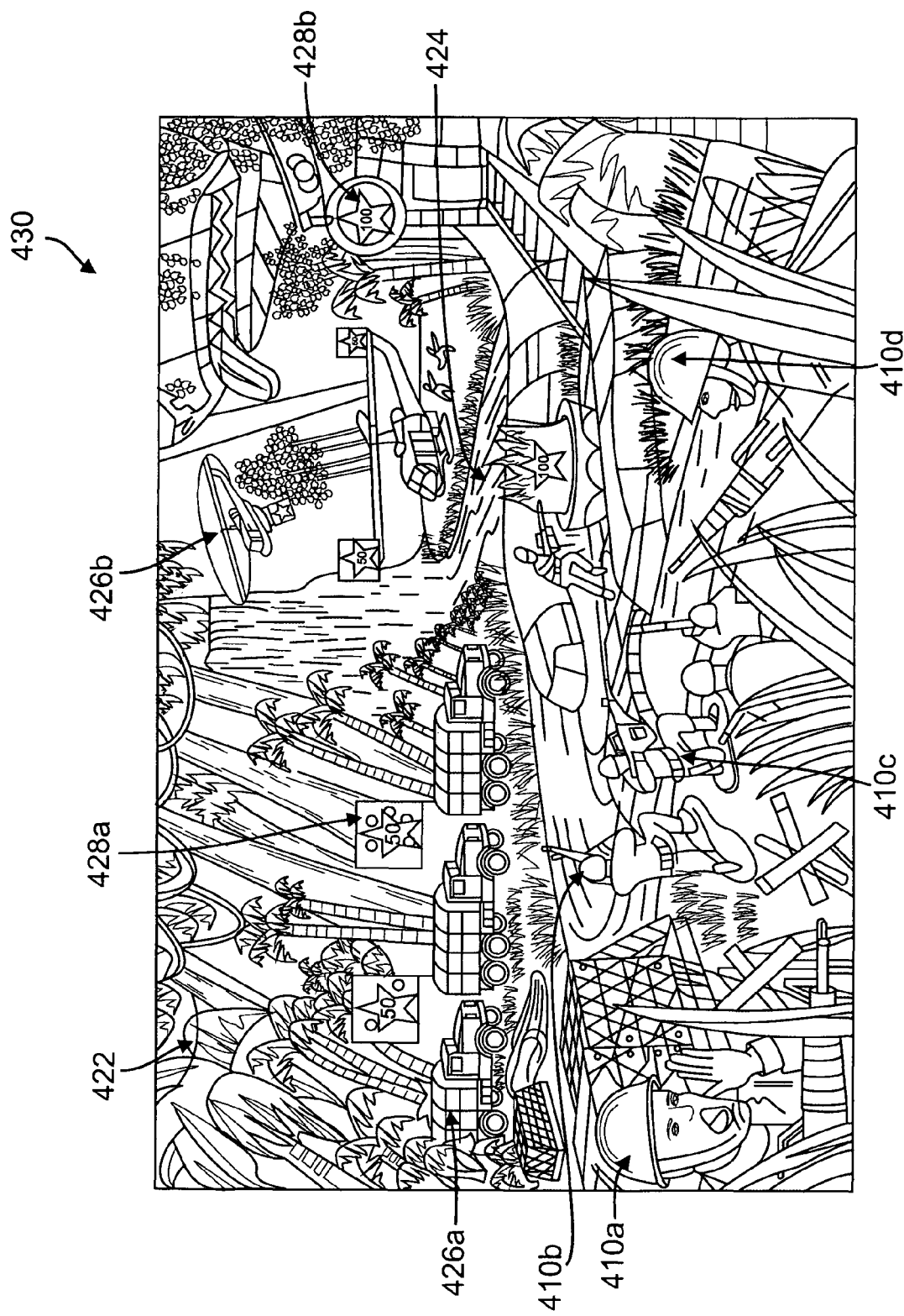
FIG. 4 shows a visual frame of an exemplary custom virtual theme park experience in the form of a jungle warfare shooting game, produced according to one embodiment of the present invention.

Turning now to FIG. 4, FIG. 4 shows visual frame 430 of an exemplary custom virtual theme park experience in the form of the jungle warfare shooting game discussed previously and produced according to one embodiment of the present invention. As can be seen from FIG. 4, the overarching motif of the experience is that of a shooting game, as indicated by armed protagonist soldier FIGS. 410a, 410b, 410c, and 410d. Also shown in FIG. 4 are customizable features associated with a shooting game motif and selected by the user producing the jungle warfare shooting game of which visual frame 400 is a portion. Selected customizable features include jungle warfare environment 422, river 424, transport truck target 426a, attack helicopter target 426b, and target values 428a and 428b. Assembly of the designated motif and selected customizable features results in the seamless presentation of the custom virtual jungle warfare shooting game shown by visual frame 430.

Thus, the present application discloses a method and system for customizing a theme park experience. By enabling an individual computer user to designate a theme park experience motif for customizing, one embodiment of the present invention allows a prospective theme park guest to become involved in designing a type of attraction of interest to them. By further enabling the computer user to select customizable features associated with the designated motif and assemble those elements, one embodiment of the present invention permits an individual computer user to produce a custom virtual theme park experience suitable for adaptation as a customized theme park experience for enjoyment in-park, in accord with their personal entertainment preferences. Moreover, by allowing other interested members of a community to enjoy a virtual version of the theme park experience and provide rating feedback, one embodiment of the present invention helps to assure that customized theme park attractions provided in-park are appealing to a broad spectrum of theme park guests.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method of providing a customized theme park experience at a theme park, the method comprising:
    designating a theme park experience motif from among predetermined motifs contained in a motifs database, in response to an input received by a client computer from an online user located remotely from the theme park, to produce a designated motif;
    selecting one or more customizable features associated with the designated motif from among features contained in a customizable features database, in response to one or more additional inputs received by the client computer from the online user, to provide selected one or more customizable features;
    assembling the designated motif and the selected one or more customizable features by the online user into a user-generated custom virtual theme park experience suitable for adaptation as a user-generated customized theme park experience;
    hosting the user-generated custom virtual theme park experience for online use by other online users located remotely from the theme park; and
    providing the user-generated customized theme park experience, adapted based on the user-generated custom virtual theme park experience, to visitors of the theme park in conjunction with an in-park attraction.

2. The method of claim 1, further comprising providing a popularity rating of the user-generated custom virtual theme park experience among the other online users.

3. The method of claim 2, further comprising providing a selection of the user-generated custom virtual theme park experience for adaptation as the user-generated customized theme park experience based on the popularity of the user-generated custom virtual theme park experience.

4. The method of claim 1, further comprising associating the user-generated customized theme park experience with a user access code.

5. The method of claim 1, wherein the designated motif comprises an interactive shooting game.

6. The method of claim 5, wherein the selecting of the one or more customizable features comprises selecting one or more targets of the interactive shooting game.

7. The method of claim 1, wherein the designated motif comprises a dramatic entertainment.

8. The method of claim 1, wherein the designated motif comprises an informative presentation.

9. The method of claim 8, wherein the user-generated customized theme park experience comprises a guided tour.

10. The method of claim 1, further comprising providing a downloading of a customized theme park experience design content including an interactive custom virtual theme park experience design application, the motifs database, and the customizable features database, to the client computer.

11. The method of claim 1, further comprising providing a customized theme park experience design content including an interactive custom virtual theme park experience design application, the motifs database, and the customizable features database to the client computer.

12. The method of claim 1, wherein the providing provides a tour including a video simulation of a personalized tour guide using a display unit.

13. A host system capable of enabling design of a customized theme park experience, the host system comprising:
   a content server configured to:
      designate a theme park experience motif from among predetermined motifs contained in a motifs database, in response to an input received by a client computer from an online user located remotely from the theme park, to produce a designated motif;
      select one or more customizable features associated with the designated motif from among features contained in a customizable features database, in response to one or more additional inputs received by the client computer from the online user, to provide selected one or more customizable features;
      assemble the designated motif and the selected one or more customizable features by the online user into a user-generated custom virtual theme park experience suitable for adaptation as a user-generated customized theme park experience; and
      hosting the user-generated custom virtual theme park experience for online use by other online users located remotely from the theme park;
      wherein the user-generated customized theme park experience is adaptable based on the user-generated custom virtual theme park experience for use by visitors of the theme park in conjunction with an in-park attraction.

14. The host system of claim 13, wherein the host system is configured to interact with a client computer utilized by the online user so as to enable the online user to design the user-generated custom virtual theme park experience.

15. The host system of claim 13, further comprising a custom virtual theme park experience storage configured to store a user designed custom virtual theme park experience.

16. The host system of claim 13, wherein the content server is further configured to provide a popularity rating of the user-generated custom virtual theme park experience among the other online users.

17. The host system of claim 16, wherein the content server is further configured to provide a selection of the user-generated custom virtual theme park experience for adaptation as the user-generated customized theme park experience based on the popularity of the user-generated custom virtual theme park experience.

18. The host system of claim 13, wherein the content server is further configured to associate the user-generated customized theme park experience with a user access code.

19. The host system of claim 13, wherein the content server is further configured to provide a tour including a video simulation of a personalized tour guide using a display unit.

* * * * *